(12) United States Patent
Gruzberg

(10) Patent No.: US 7,977,905 B1
(45) Date of Patent: Jul. 12, 2011

(54) ELECTRIC DRIVE

(76) Inventor: Eduard Gruzberg, Tveria (IL)

( * ) Notice: Subject to any disclaimer, the term of this patent is extended or adjusted under 35 U.S.C. 154(b) by 0 days.

(21) Appl. No.: 12/659,040

(22) Filed: Feb. 24, 2010

(51) Int. Cl.
*H02P 1/00* (2006.01)
(52) U.S. Cl. .................................... 318/500; 318/459
(58) Field of Classification Search .................. 318/500, 318/459, 362, 366, 368
See application file for complete search history.

(56) References Cited

U.S. PATENT DOCUMENTS

| | | | | |
|---|---|---|---|---|
| 3,761,851 A | * | 9/1973 | Nelson | 335/253 |
| 3,806,785 A | * | 4/1974 | DeValroger et al. | 318/400.2 |
| 4,563,602 A | * | 1/1986 | Nagasaka | 310/12.22 |
| 4,959,595 A | * | 9/1990 | Nishimura | 318/400.41 |
| 5,111,095 A | * | 5/1992 | Hendershot | 310/168 |
| 2007/0090696 A1 | * | 4/2007 | Sugita et al. | 310/12 |

* cited by examiner

*Primary Examiner* — Rina I Duda
(74) *Attorney, Agent, or Firm* — I. Zborovsky

(57) ABSTRACT

An electric drive which has an inductor with poles, an armature having a plurality of windings and rotatable relative to the inductor and its poles, and a control unit which, when a respective one of the windings of the armature approaches a respective one of the poles of the inductor, turns off a voltage supply to the winding so that when the winding passes the pole it does not have a voltage, and when the winding moves away from the pole the control unit supplies opposite voltage to the winding, and therefore no counter electric motive force is generated during the operation of the electric drive.

4 Claims, 1 Drawing Sheet

ELECTRIC DRIVE

BACKGROUND OF THE INVENTION

The present invention relates to electric drives, such as electric motors, magneto-electric converters, etc.

Electric drives of the above mentioned general type are known. In the known electric drives inductor carries poles, and an armature carries a plurality of windings and is rotatable relative to the inductor. One of the disadvantages of the known electric drives of this type is that when a winding of the armature moves past the corresponding pole, a counter electric motive force is generated, which reduces the efficiency of the electric drive. It is believed that it would be advisable to improve the existing electric drives.

SUMMARY OF THE INVENTION

Accordingly, it is an object of the present invention to provide an electric drive which avoids the disadvantages of the prior art.

More particularly, it is an object of the present invention to provide an electric drive having an inductor with poles and a rotatable armature with windings which rotates relative to the inductor, wherein counter electric motive force is eliminated, and therefore the electric drive has a significantly higher efficiency.

In keeping with these objects and with others which will become apparent hereinafter, one feature of the present invention resides, briefly stated, in an electric drive which has an inductor with poles, and an armature having a plurality of windings and rotatable relative to the inductor and its poles, wherein means is provided which, when a respective one of said windings of said armature approaches a respective one of said poles of said inductor, turns off a voltage supply to said winding so that when said winding passes said pole it does not have a voltage, and when said winding moves away from said pole said means supply opposite voltage to said winding, and therefore no counter electric motive force is generated during the operation of the electric drive.

Another feature of the present invention resides, briefly stated, in a method of operating an electric drive, comprising the steps of providing an electric drive which has an inductor with poles, rotating an armature having a plurality of windings relative to the inductor and its poles, when a respective one of said windings of said armature approaches a respective one of said poles of said inductor turning off a voltage supply to said winding so that when said winding passes said pole it does not have a voltage, and when said winding moves away from said pole supplying opposite voltage to said winding, so that no counter electric motive force is generated during the operation of the electric drive.

Still a further feature of the present invention resides in that the electric drive in accordance with the present invention has means for determining when a winding of the armature moves toward a corresponding pole of the inductor and providing a signal to control means, and determining when the same winding moves away from the pole and provides a corresponding signal to the control means so that the control means turns off a voltage supply to the winding and then supplies an opposite voltage to the winding correspondingly.

Still a further feature of the present invention resides in that the method in accordance with the present invention includes determining when a winding of the armature moves toward a corresponding pole of the inductor and providing a signal to control means, and determining when the same winding moves away from the pole and providing a corresponding signal to the control means and turning off a voltage supply to the winding and then supplying an opposite voltage to the winding correspondingly.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing an electric drive in accordance with the present invention.

DESCRIPTION OF THE PREFERRED EMBODIMENTS

Figure 1:
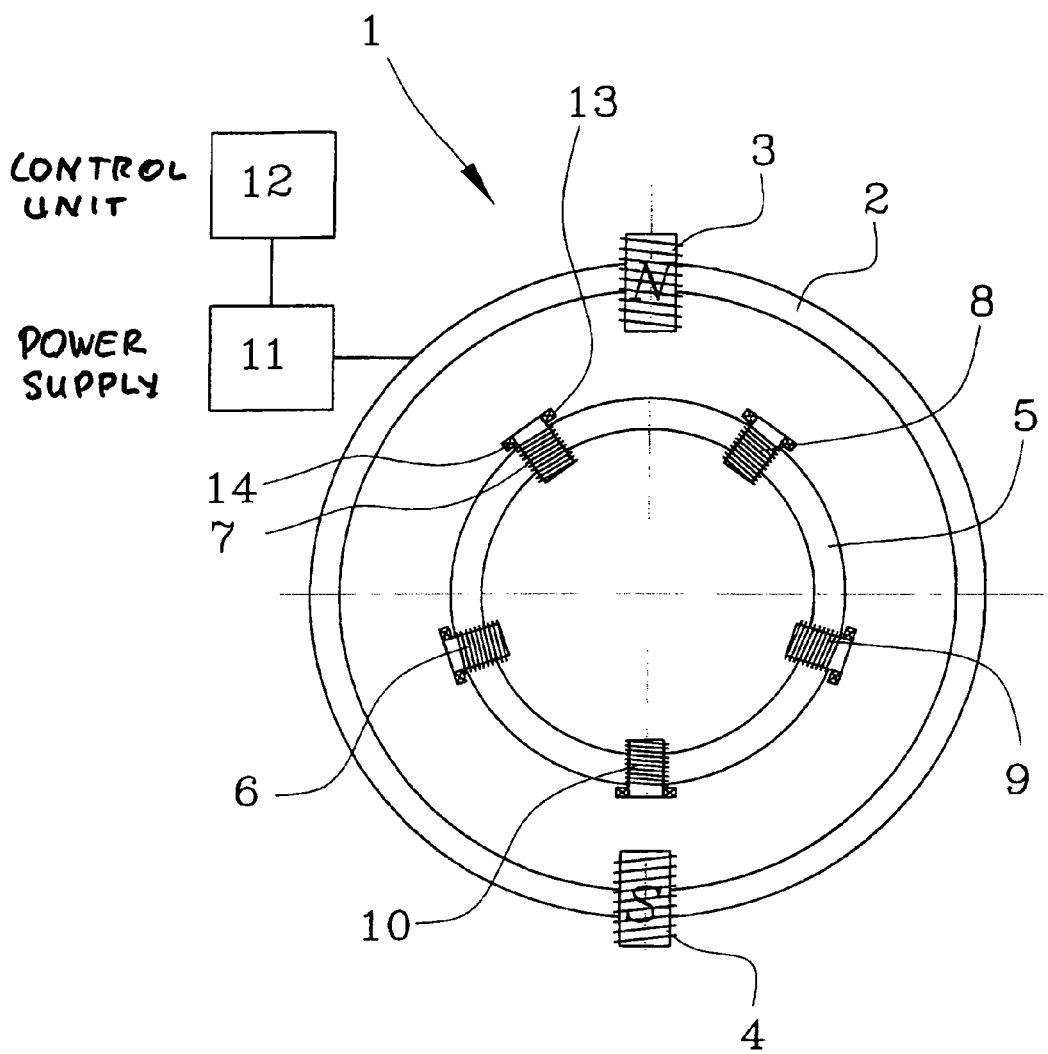

An electric drive in accordance with the present invention is formed in this embodiment as an electric motor which is identified as a whole with reference numeral 1. The electric motor 1 has an inductor 2 provided with a north pole 3 and a south pole 4, which can be formed by corresponding windings.

An armature 5 of the electric motor 1 is located inside the inductor 2 and has a plurality of windings 6, 7, 8, 9, 10. Power supply means are identified with reference numeral 11. The electric drive 1 is provided with a control unit which is identified with reference numeral 12.

During the operation of the electric drive the voltage is supplied to the poles 3 and 4 of the inductor 2 and to the winding 6, 7, 8, 9, 10 of the armature 5. The control unit 12 is configured so that when one of the windings, for example the winding 7 of the of the armature 5, approaches one of the poles, for example the pole 3 of the inductor 2 and is in close proximity to the pole, for example 10-15 millimeters, the power supply unit 11 turns off the supply of voltage to the winding 7 and the winding 7, when it passes past (under) the pole 3, does not have any voltage.

When the winding 7 with its back side starts moving away from the pole 3 the control unit 12 controls the power supply 11 so that the winding 7 is supplied with an opposite voltage. Therefore when the winding 7 approaches the pole 3 it is attracted to the pole 3 and then when the winding 7 departs from the pole 3 it is repelled from the pole 3, to provide uninterrupted rotation of the armature relative to the inductor.

Since when the winding 7 during the period of movement under the pole 3 does not have voltage, no counter electric motive force is generated.

The same operation repeats successively for all windings 6-10 of the electric drive.

In order to turn off the voltage supply to the winding when it approaches the corresponding pole and to supply the counter voltage when it departs from the corresponding pole, means are provided to determine the approaching phase and the departing phase of the corresponding winding. In particular, each winding can be provided with two proximities switches 13 and 14. The proximity switch 13 determines the moment when the right side of the winding 7 approaches the left side of the pole 3, while the proximity switch 14 determines the point when the left side of the winding 7 starts moving away from the right side of the pole 3.

The proximity switches 13 and 14 send corresponding signals to the control unit-to turn off the voltage from the winding 7 upon approaching the pole 3, and to turn on an opposite voltage upon departing of the winding 7 from the pole 3.

It will be understood that each of the elements described above, or two or more together, may also find a useful application in other types of constructions and methods differing from the type described above.

While the invention has been illustrated and described as embodied in electric drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. An electric drive, comprising an inductor with poles; an armature having a plurality of windings and rotatable relative to the inductor and its poles; and control means for controlling a voltage supply to the winding of the armature, such that when a respective one of said windings of said armature approaches a respective one of said poles of said inductor said means turns off a voltage supply to said winding so that when said winding passes past said pole it does not have a voltage, and when said winding moves away from said pole said control means supply opposite voltage to said winding, and therefore no counter electric motive force is generated during the operation of the electric drive.

2. An electric drive as defined in claim 1, further comprising means for determining when a winding of the armature moves toward a corresponding pole of the inductor and providing a signal to said control means, and determining when the same winding moves away from the pole and provides a further signal to said control means so that said control means turns off a voltage supply to the winding and then supplies an opposite voltage to the winding correspondingly.

3. A method of operating an electric drive, comprising the steps of providing an electric drive which has an inductor with poles; rotating an armature having a plurality of windings relative to the inductor and its poles; and when a respective one of said windings of said armature approaches a respective one of said poles of said inductor turning off a voltage supply to said winding so that when said winding passes said pole it does not have a voltage, and when said winding moves away from said pole supplying opposite voltage to said winding, so that no counter electric motive force is generated during the operation of the electric drive.

4. A method as defined in claim 3, further comprising determining when a winding of the armature moves toward a corresponding pole of the inductor and providing a signal to control means; and determining when the same winding moves away from the pole and providing a further signal to the control means, and turning off a voltage supply to the winding in response to said signal and then supplying an opposite voltage to the winding in response to said further signal correspondingly.

* * * * *